(12) United States Patent
Cao et al.

(10) Patent No.: US 10,346,263 B2
(45) Date of Patent: *Jul. 9, 2019

(54) HOST SWAP HYPERVISOR THAT PROVIDES HIGH AVAILABILITY FOR A HOST OF VIRTUAL MACHINES

(71) Applicant: International Business Machines Corporation, Armonk, NY (US)

(72) Inventors: Bin Cao, Rochester, MN (US); Jim C. Chen, Rochester, MN (US); Lauren A. Somers, Bloomington, MN (US)

(73) Assignee: International Business Machines Corporation, Armonk, NY (US)

(*) Notice: Subject to any disclaimer, the term of this patent is extended or adjusted under 35 U.S.C. 154(b) by 173 days.

This patent is subject to a terminal disclaimer.

(21) Appl. No.: 15/424,704

(22) Filed: Feb. 3, 2017

(65) Prior Publication Data
US 2017/0147452 A1 May 25, 2017

Related U.S. Application Data

(63) Continuation of application No. 14/305,511, filed on Jun. 16, 2014, now Pat. No. 9,606,878, which is a
(Continued)

(51) Int. Cl.
*G06F 11/00* (2006.01)
*G06F 11/14* (2006.01)
*G06F 11/07* (2006.01)

(52) U.S. Cl.
CPC ...... *G06F 11/1484* (2013.01); *G06F 11/0712* (2013.01); *G06F 11/0751* (2013.01);
(Continued)

(58) Field of Classification Search
CPC ............. G06F 11/1484; G06F 9/45533; G06F 9/45558
See application file for complete search history.

(56) References Cited

U.S. PATENT DOCUMENTS 5,437,033 A * 7/1995 Inoue .................. G06F 9/45533
714/10
7,877,639 B2 * 1/2011 Hoang ................ G06F 11/1666
713/1
(Continued)

FOREIGN PATENT DOCUMENTS

EP 2637097 A1 9/2013

OTHER PUBLICATIONS

Dell Internal Dual SD Module (ISDSM), Mar. 2010.
(Continued)

*Primary Examiner* — Elmira Mehrmanesh
(74) *Attorney, Agent, or Firm* — Martin & Associates, LLC; Bret J. Petersen

(57) ABSTRACT

A host swap hypervisor provides a high availability hypervisor for virtual machines on a physical host computer during a failure of a primary hypervisor on the physical host computer. The host swap hypervisor resides on the physical host computer that runs the primary hypervisor, and monitors failure indicators of the primary hypervisor. When the failure indicators exceed a threshold, the host swap hypervisor is then autonomically swapped to become the primary hypervisor on the physical host computer. The original primary hypervisor may then be re-initialized as the new host swap hypervisor.

20 Claims, 7 Drawing Sheets

Related U.S. Application Data continuation of application No. 14/278,738, filed on May 15, 2014, now Pat. No. 9,612,926.

(52) U.S. Cl.
CPC ........ *G06F 11/0793* (2013.01); *G06F 11/142* (2013.01); *G06F 11/1438* (2013.01); *G06F 2201/815* (2013.01)

(56) References Cited

U.S. PATENT DOCUMENTS

| | | | |
|---|---|---|---|
| 8,239,863 B2 | 8/2012 | Bhat et al. | |
| 8,874,954 B1* | 10/2014 | Gupte | G06F 11/2028 714/1 |
| 9,176,767 B2* | 11/2015 | Cantu | G06F 9/45558 |
| 9,606,878 B2* | 3/2017 | Cao | G06F 11/2023 |
| 9,612,926 B2* | 4/2017 | Cao | G06F 11/2023 |
| 2008/0189700 A1* | 8/2008 | Schmidt | G06F 11/203 718/1 |
| 2011/0022882 A1 | 1/2011 | Jaehde et al. | |
| 2011/0023030 A1* | 1/2011 | Lim | G06F 9/45558 718/1 |
| 2011/0321041 A1* | 12/2011 | Bhat | G06F 9/4856 718/1 |
| 2012/0047501 A1 | 2/2012 | Box et al. | |
| 2012/0203875 A1 | 8/2012 | Dake et al. | |
| 2012/0297236 A1 | 11/2012 | Ziskind et al. | |
| 2013/0024494 A1 | 1/2013 | Guarrieri | |
| 2013/0263118 A1* | 10/2013 | Kannan | G06F 9/45558 718/1 |
| 2014/0149985 A1* | 5/2014 | Takeuchi | G06F 9/45558 718/1 |
| 2015/0067143 A1* | 3/2015 | Babakhan | G06F 11/301 709/224 |
| 2015/0095908 A1* | 4/2015 | Jacobs | G06F 9/45533 718/1 |

OTHER PUBLICATIONS

Dell PowerEdge R910, Jun. 2011.
Minhas et al., "RemusDB: transparent high availability for database systems", The VLDB Journal, vol. 22, pp. 29-45 (2013).
Cao et al., "Host Swap Hypervisor That Provides High Availability for a Host of Virtual Machines" U.S. Appl. No. 14/278,738, filed May 15, 2014.
Cao et al., "Host Swap Hypervisor That Provides High Availability for a Host of Virtual Machines" U.S. Appl. No. 14/305,511, filed Jun. 16, 2014.
Appendix P—List of IBM Patents or Patent Applications Treated as Related, dated Mar. 1, 2017.

* cited by examiner

Failure Indicators 522

| Failure Type | Severity Score |
|---|---|
| Hypervisor – Slow Response | 5 |
| Hypervisor – Nonresponsive | 10 |
| Connection Errors From VM | 3 |
| Software Upgrade | 2 |

FIG. 6

Mappings Table 524

| Processor | Storage | Memory | Other |
|---|---|---|---|
|  |  |  |  |
|  |  |  |  |
|  |  |  |  |

FIG. 7

HOST SWAP HYPERVISOR THAT PROVIDES HIGH AVAILABILITY FOR A HOST OF VIRTUAL MACHINES

BACKGROUND

1. Technical Field

This invention generally relates to virtual machines in a distributed cloud computing environment, and more specifically relates to a host swap hypervisor running on a physical host computer with a primary hypervisor to provide a high availability hypervisor for the virtual machines on the physical host computer during a failure of the primary hypervisor for the virtual machines.

2. Background Art

Cloud computing is a common expression for distributed computing over a network and can also be used with reference to network-based services such as Infrastructure as a Service (IaaS). IaaS is a cloud based service that provides physical processing resources to run virtual machines (VM) as a guest for different customers. The virtual machine may host a user application or a server. As used herein, a hypervisor is a partitions manager that manages the virtualization of a server's resources, meaning it manages an environment where multiple virtual machines are hosted on a single physical computer system. The hypervisor is responsible for allocating and managing resources (e.g. memory and processor) across multiple virtual machines running on a given server or system.

High availability means availability despite planned outages for upgrades or unplanned outages caused by hardware or software failures. When a hypervisor on a physical host fails it is desirable for the virtual machines executing on the host to continue uninterrupted.

BRIEF SUMMARY

An apparatus and method for a host swap hypervisor provides a high availability hypervisor for virtual machines on a physical host computer during a failure of a primary hypervisor on the physical host computer. The host swap hypervisor resides on the physical host computer that runs the primary hypervisor, and monitors failure indicators of the primary hypervisor. When the failure indicators exceed a threshold, the host swap hypervisor is then autonomically swapped to become the primary hypervisor on the physical host computer. The original primary hypervisor may then be re-initialized as a new host swap hypervisor.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 6 is a block diagram of suitable examples of failure indicators as described herein;

FIG. 7 is a block diagram of a suitable example of a mappings table as described herein;

DETAILED DESCRIPTION

Figure 1:
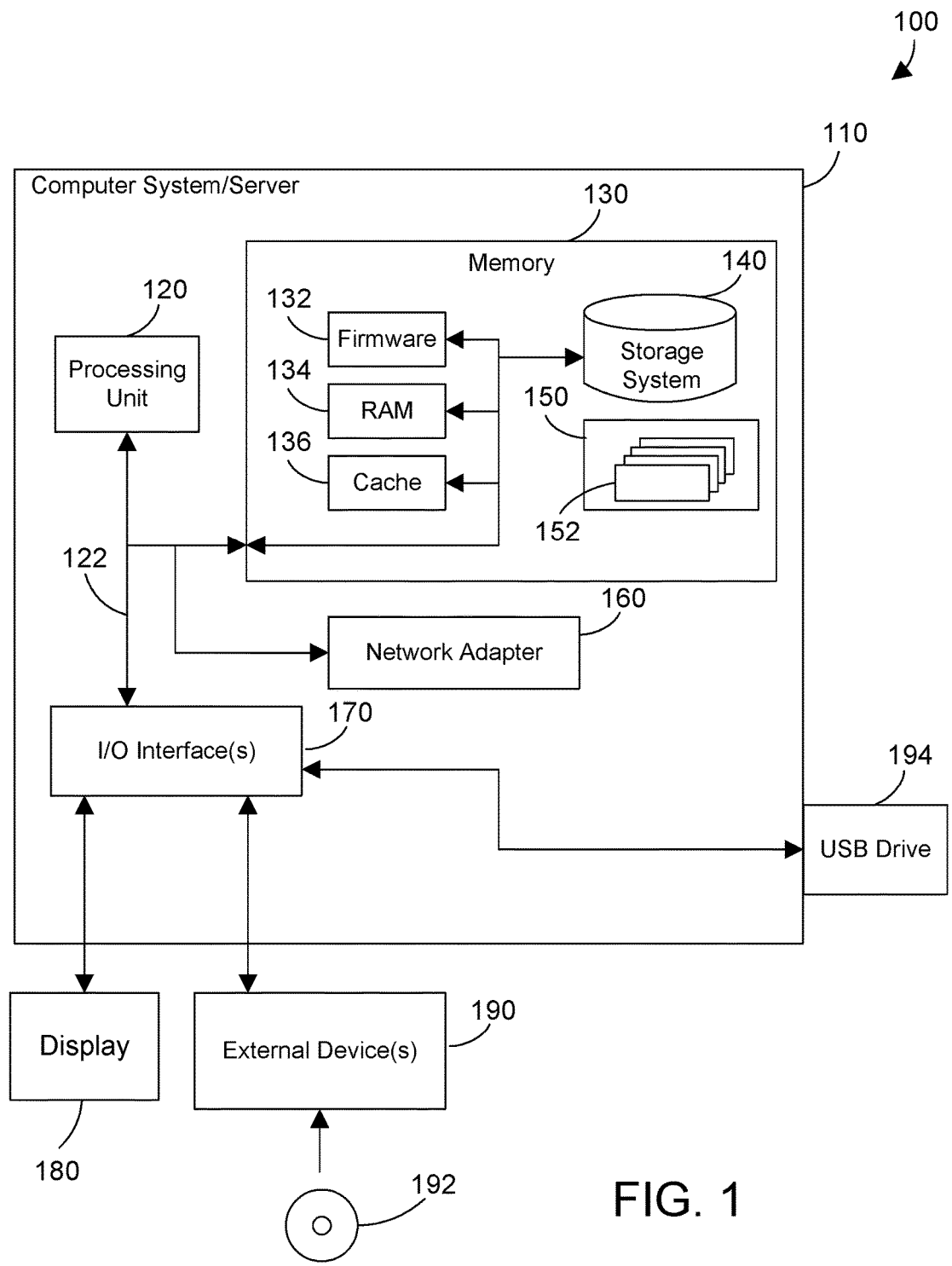
FIG. 1 is a block diagram of a cloud computing node.

The claims and disclosure herein provide mechanisms and methods for a host swap hypervisor that provides a high availability hypervisor for virtual machines on a physical host computer during a failure of a primary hypervisor on the physical host computer. The host swap hypervisor resides on the physical host computer that runs the primary hypervisor, and monitors failure indicators of the primary hypervisor. When the failure indicators exceed a threshold, the host swap hypervisor is then autonomically swapped to become the primary hypervisor on the physical host computer. The original primary hypervisor may then be re-initialized as the new host swap hypervisor.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. Examples of removable media are shown in FIG. 1 to include a Digital Video Disc (DVD) 192 and a USB drive 194.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. One suitable example of an external device 190 is a DVD drive which can read a DVD 192 as shown in FIG. 1. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
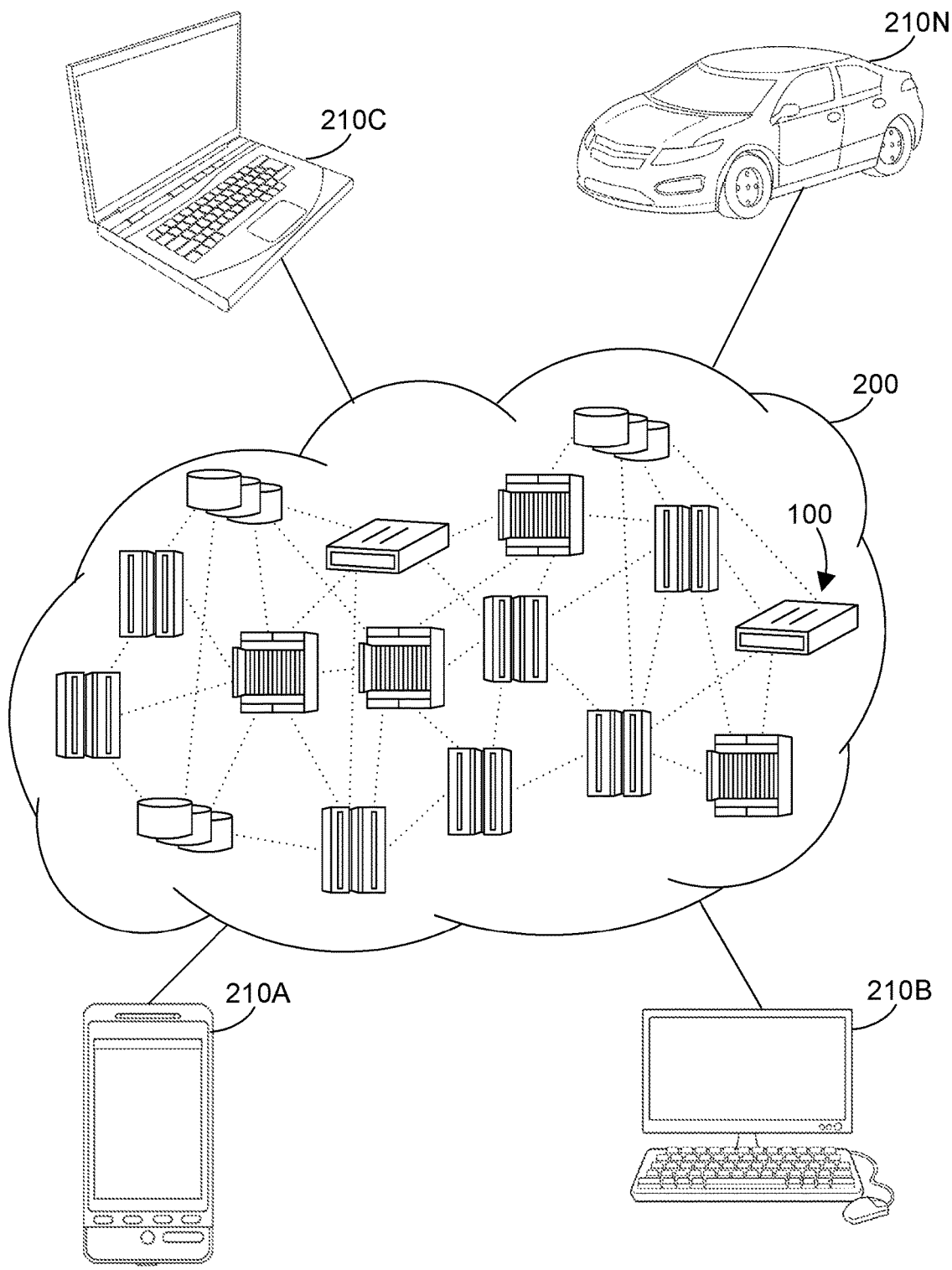
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
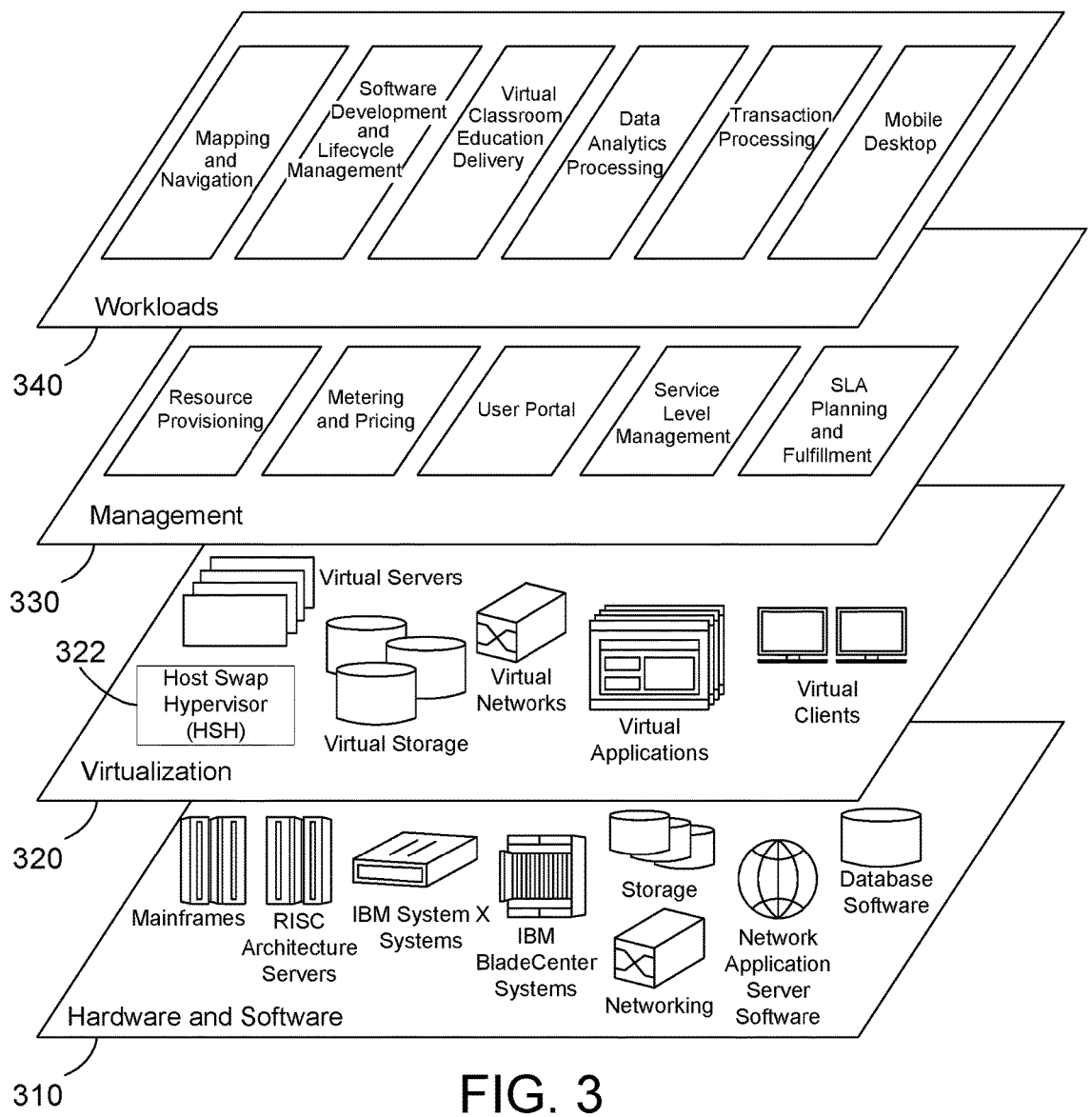
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, Web Sphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients. The virtualization layer 320 also includes a host swap hypervisor 322 as described further below.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing and mobile desktop.

The present invention may be a system, a method, and/or a computer program product. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
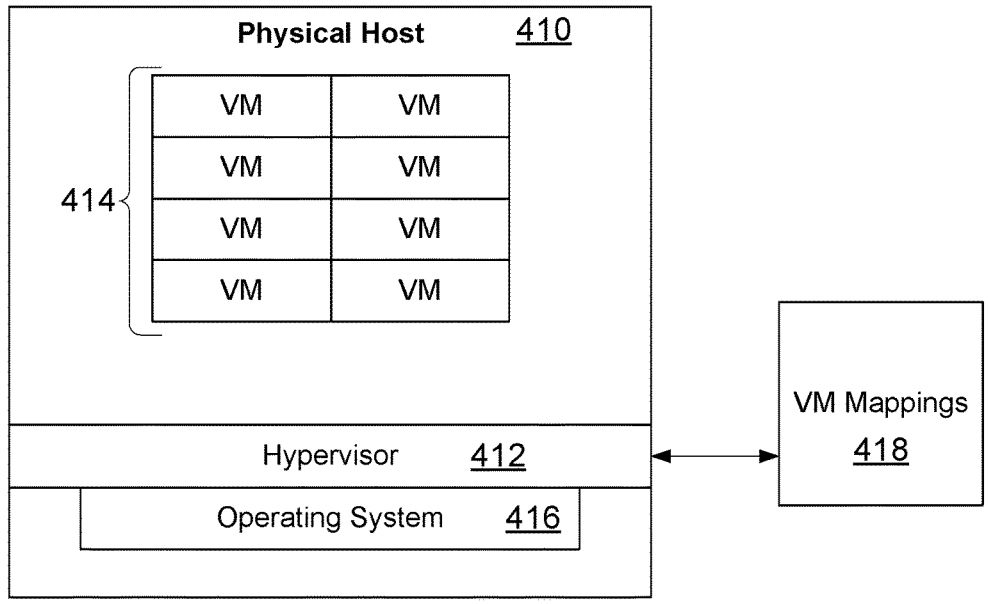
FIG. 4 is a block diagram of a physical host computer hosting virtual machines with a hypervisor according to the prior art.

Referring now to FIG. 4, a block diagram illustrates a physical host computer 410 with a hypervisor 412 according to the prior art. The hypervisor 412 is software, firmware or hardware that creates and runs virtual machines 414. The hypervisor 412 may incorporate the functions of the virtualization layer 320 in FIG. 3. In this example, the hypervisor 412 is a hosted hypervisor that runs within an environment of an operating system 416. The hypervisor 412 creates and maintains VM mappings 418. The VM mappings 418 may be stored in RAM 134 or the storage system 140 shown in FIG. 1. The VM mappings 418 contain the resource information for VM machines such as CPU allocation, memory allocations and storage allocations.

Figure 5:
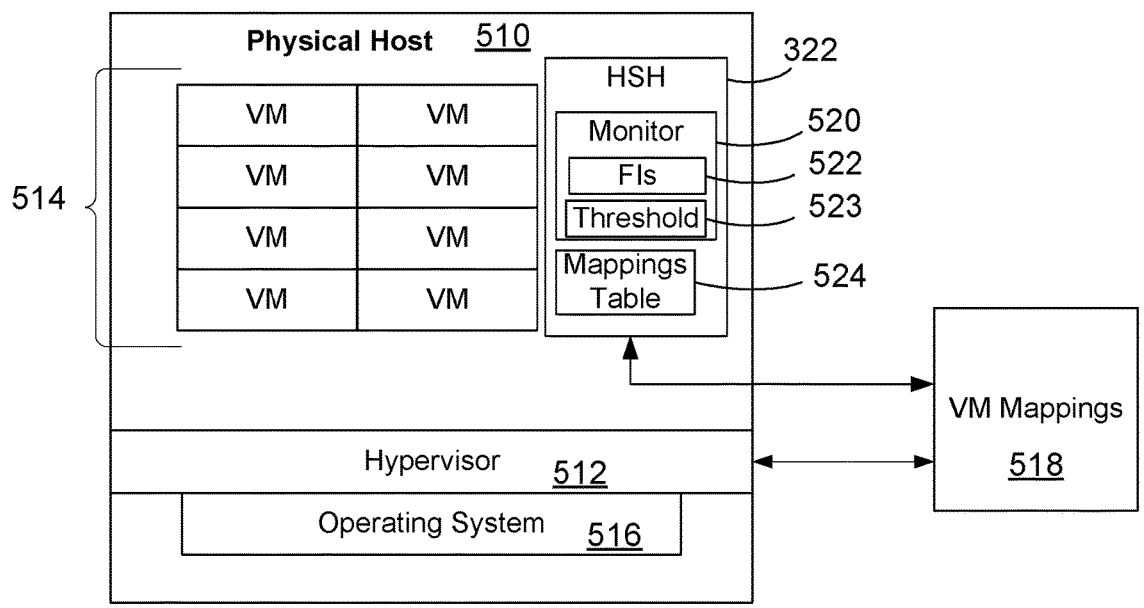
FIG. 5 is a block diagram of a physical host computer hosting virtual machines with a host swap hypervisor as described herein.

FIG. 5 is a block diagram of a physical host computer 510 with a host swap hypervisor (HSH) 322 as described herein. The physical host computer 510 has a hypervisor 512 that operates in a similar manner as known in the prior art. Thus, the hypervisor 512 is used to create and run the VMs 514 in a similar manner as known in the prior art. Hypervisor 512 is also referred to herein as the "primary hypervisor" to distinguish it from the host swap hypervisor 322. In this example, the hypervisor 512 is a hosted hypervisor that runs within an environment of an operating system 516. In some cases such as with a Kernel-based Virtual Machine (KVM) hypervisor (not shown), the host swap hypervisor 322 would need an operating system independent of the operating system 516 to support the host swap hypervisor when it takes over as the primary hypervisor. The hypervisor 512 creates and maintains VM mappings 518 similar to the prior art. The VM mappings 518 keep track of memory allocation ranges within the hosted environment, active and inactive VM connections within the hosted environment to the primary hypervisor, and information regarding the primary hypervisor attributes and host environment attributes. The VM mappings 518 may be stored in any convenient location, including local RAM memory 134, a cache 136, a local storage system 140 or on an external device 190 (all shown in FIG. 1). The VM mappings 518 are stored in such a way as to be accessible to both the primary hypervisor and the host swap hypervisor.

Again referring to FIG. 5, the host swap hypervisor 322 is a specialized, unique VM on the physical host computer 510. The host swap hypervisor 322 includes a monitor 520 that monitors the hypervisor and conditions of the host computer system to detect potential failures of the primary hypervisor. The monitor 520 may include a number of failure indicators 522 and a severity threshold 523 as described further below. The failure indicators 522 and the severity threshold 523 may be set up by a system administrator or fixed in the software. In the illustrated example, the host swap hypervisor 322 further maintains an awareness of memory allocation and connection topography of all VMs connected to the host hypervisor. The host swap hypervisor 322 may include a mappings table 524 to maintain this awareness. In this example, the mappings table 524 is used by the host swap hypervisor to keep track of the information in the VM mappings 518 as described further below FIG. 6 illustrates a block diagram that illustrates some examples of failure indicators 522 of the host swap hypervisor 322. The monitor 520 of the host swap hypervisor 322 shown in FIG. 5 actively monitors the host environment and continually refreshes information about the state of the environment. The monitor 520 looks for indications of primary hypervisor failure. In the illustrated example, the monitor 520 uses a number of failure indicators 522 to determine when a failure is about to occur or a failure has occurred. A failure could include a problem with the hypervisor, host hardware that impacts the hypervisor or a software issue. A failure of the host which is related to the hypervisor may also be used as a failure indicator. For example, a host failure related to the hypervisor may be indicated by a VM status or VM communication with the host controller. The failure indicators may include a severity score. The severity score for each observed failure summed together provide a metric to be compared against a threshold. If the severity score of the observed failures exceeds a predetermined severity threshold, the host swap hypervisor executes a recovery action to make the swap and take over as the primary hypervisor to ensure the environment remains functional. In the example shown in FIG. 6, the failure indicators 522 include a failure type 612 and a severity score 614. The failure types include a hypervisor with a slow response 616 with a severity score of "5" 618 and a hypervisor which is non-responsive 620 with a severity score of "10" 622. The failure types in the example further include connection errors from VMs 624 with a severity score of "3" 626 and a failure type of software or firmware upgrades to the hypervisor 628 with a severity score of "2" 630.

When the monitor 520 (FIG. 5) detects a complete primary hypervisor failure or the severity score of the failure indicators exceed a set severity threshold, the host swap hypervisor will execute a series of actions to take over the failing primary hypervisor. The actions taken by the host swap hypervisor include redefining itself according to the definitions, settings or attributes of a primary hypervisor, allocating the necessary resources to itself thereby expanding its footprint to match that of a primary hypervisor and re-establishing all VMs that were connected to the original primary hypervisor. If the host environment is able to recover the original hypervisor, the original hypervisor will be reconnected to the new primary hypervisor (which was formerly the host swap hypervisor). However the original hypervisor will not reconnect as a normal VM, but instead, the original primary hypervisor will be re-initialized to serve as a new instance of a host swap hypervisor. For the example illustrated in FIG. 6, if we assume the severity threshold is set at "10", then any combination of severity scores that added together equals or exceeds 10 would indicate a failure of the primary hypervisor and trigger the host swap hypervisor to take over. After the host swap hypervisor establishes management of the virtual machines, it may perform an integrity check of the established connections and allocations. The integrity check can be performed by the host swap hypervisor sending typical hypervisor commands to the virtual machines and monitoring if the virtual machines respond appropriately.

FIG. 7 illustrates a block diagram that represents a mappings table 524 of the host swap hypervisor 322. As described above, the VM mappings 518 in FIG. 5 includes processor storage and memory allocation, active and inactive VM connections within this hosted environment, and information regarding the primary hypervisor attributes and host environment attributes. The host swap hypervisor can store similar information in the mappings table 524. In the example shown in FIG. 7, the host swap hypervisor manages the mappings table 524 to track the changes to the VM mappings 518 to assist in restoring the VM mappings 518 in the event of a failure of the primary hypervisor. Thus the mappings table 524 is data stored by the host swap hypervisor that contains historical processor, historical storage and historical memory information for the virtual machines managed by the primary hypervisor. Other historical information may be stored such as network information, security policies, groups and tenant information, state of a machine, etc. In the example shown in FIG. 7, the historical information is stored in a table with processor 710, storage 712, memory data 714, and other 716. This information may be stored for multiple snap shots in time as represented by the additional rows 718 for each of the data types. This historical data 718 can assist the host swap hypervisor to recover from errors.

Again referring to FIG. 7 we will consider an example of using the historical data 718 stored in the mappings table 524 to assist the host swap hypervisor 322 (FIG. 5) in recovering from errors in the primary hypervisor 512 (FIG. 5). Typically the mapping information for the primary hypervisor and the host swap hypervisor are constantly verified and updated. For example, for a virtual machine VM1, the host swap hypervisor updates VM1's network information (typically on a fixed interval) and stores that information in its mappings. If the network information stored in the primary hypervisor matches the updated information in the host swap hypervisor's mapping, then no failure is detected. If the data does not match, a set of further verification steps can be taken. For example, a detailed XML dump request of any disputed VM(s) can be requested and the results compared. If the information obtained by the host swap hypervisor is verified, then it takes over and restores the VMs based on its current (verified) mappings. However, if VM1 is unreachable, meaning it has failed and is not responding, then host swap hypervisor (now the primary hypervisor) can reconfigure its network based on the latest verified information stored in the host swap hypervisor's mapping and reboot VM1.

Figure 8:
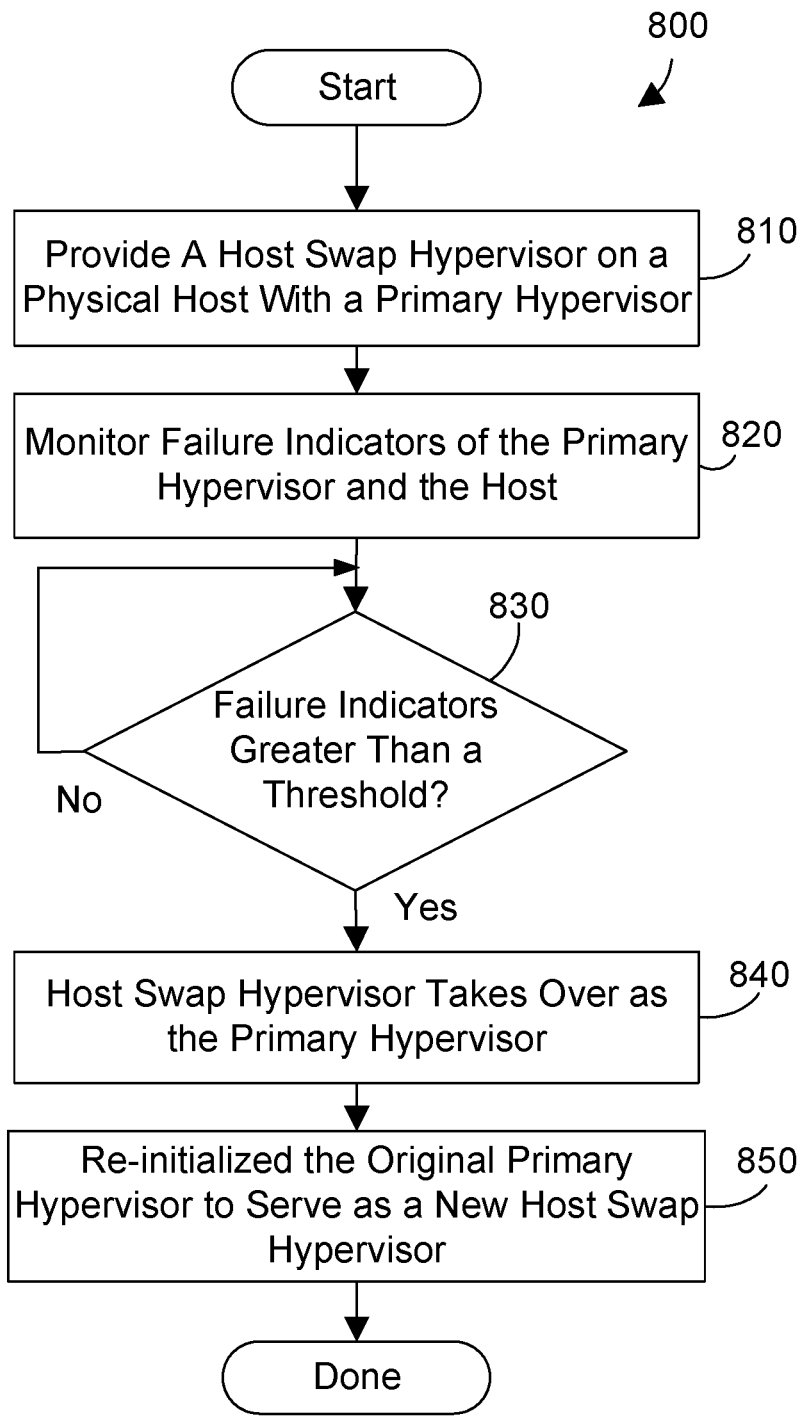
FIG. 8 is a flow diagram of a method for a host swap hypervisor as described and claimed herein.

Referring now to FIG. 8, a flow diagram shows method 800 for a host swap hypervisor that provides high availability for virtual machines on a physical host computer during a failure of a primary hypervisor as described and claimed herein. The method 800 is presented as a series of steps. The steps of method 800 may be performed by the primary hypervisor, the host swap hypervisor, or other entities in the computer system. Provide a host swap hypervisor on a physical host with a primary hypervisor (step 810). Monitor failure indicators of the primary hypervisor and the host computer system (step 820). If the failure indicators are not greater than a threshold (step 830=no) then return to step 820 and continue to monitor the failure indicators. If the failure indicators are greater than a threshold (step 830=yes) then the host swap hypervisor takes over as the primary hypervisor (step 840). Re-initialize the original primary hypervisor to serve as the new host swap hypervisor (step 850). The method is then done.

Figure 9:
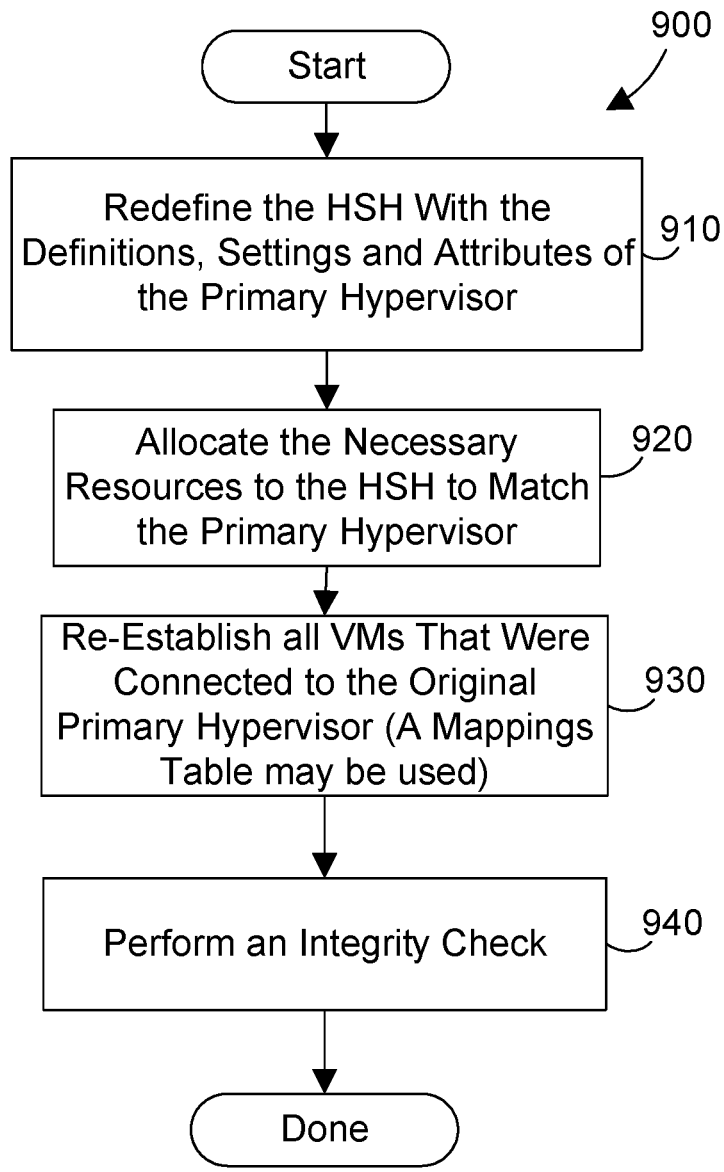
FIG. 9 is a flow diagram of a method for step 840 in FIG. 8 for the host swap hypervisor to take over as the primary hypervisor.

Referring now to FIG. 9, a flow diagram shows method 900 for a host swap hypervisor as described and claimed herein. Method 900 is one example of a method for accomplishing step 840 in FIG. 8. The steps of method 900 may be performed by the primary hypervisor, the host swap hypervisor, or other entities in the computer system. Redefine the host swap hypervisor with all the definitions, settings and attributes of the primary hypervisor (step 910). Allocate the necessary resources to the host swap hypervisor to match the primary hypervisor (step 920). Re-establish all the virtual machines that were connected to the original primary hypervisor (a mappings table may be used to accomplish this step) (step 930). Perform an integrity check of newly established virtual machines in the host swap hypervisor (step 940). The method is then done.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The claims and disclosure herein provide an apparatus and method for a host swap hypervisor that provides high availability for virtual machines on a physical host computer. In the event of a failure of the primary hypervisor on the physical host computer determined by the host swap hypervisor monitoring failure indicators, the host swap hypervisor autonomically becomes the primary hypervisor on the physical host computer to maintain high availability to virtual machines in the host environment.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
a host computer system having at least one processor and a memory;
a primary hypervisor executing on the host computer system that manages virtual machines on the host computer system to provide resources to a user;
a host swap hypervisor executing on the host computer system, wherein the host swap hypervisor has a monitor that monitors the primary hypervisor and conditions of the host computer system and takes over management of the virtual machines when a failure of the primary hypervisor occurs; and
wherein the host swap hypervisor takes over management of the virtual machines by redefining the host swap hypervisor with definitions, settings and attributes of the primary hypervisor, allocating necessary resources to the host swap hypervisor to match the primary hypervisor, and re-establishing all the virtual machines that were connected to the primary hypervisor.

2. The apparatus of claim 1 further comprising a plurality of failure indicators that are monitored by the monitor of the host swap hypervisor to determine whether the host swap hypervisor will take over management of the virtual machines from the primary hypervisor.

3. The apparatus of claim 2 wherein each failure indicator has a severity score and the monitor adds the severity score for each observed failure indicator to find a total severity score, and the total severity score is compared to a threshold to determine whether the host swap hypervisor should take over management of the primary hypervisor.

4. The apparatus of claim 1 further comprising:
virtual machine mappings stored by the primary hypervisor that contain processor, storage and memory information for the virtual machines managed by the primary hypervisor; and
mappings data stored by the host swap hypervisor that contains processor, storage and memory information for the virtual machines managed by the primary hypervisor.

5. The apparatus of claim 4 wherein the mappings data stored by the host swap hypervisor includes historical processor, historical storage and historical memory information for the virtual machines managed by the primary hypervisor.

6. The apparatus of claim 1 wherein the host swap hypervisor is a virtual machine operating on the host computer system.

7. The apparatus of claim 1 wherein the primary hypervisor is reconfigured to become a new host swap hypervisor after a failure of the primary hypervisor and after the host swap hypervisor takes over the management of the primary hypervisor.

8. The apparatus of claim 7, wherein the host swap hypervisor performs an integrity check as part of taking over management of the primary hypervisor.

9. An article of manufacture comprising:
a primary hypervisor that manages virtual machines on a physical host computer system to provide resources to a user;
a host swap hypervisor for execution on the physical host computer system that also hosts the primary hypervisor, wherein the host swap hypervisor has a monitor that monitors the primary hypervisor and conditions of the physical host computer system and takes over management of the virtual machines when a failure of the primary hypervisor occurs;
wherein the primary hypervisor and the host swap hypervisor are software stored on a computer readable storage medium for execution on the physical host computer system; and
wherein the host swap hypervisor takes over management of the virtual machines by redefining the host swap hypervisor with definitions, settings and attributes of the primary hypervisor, allocating necessary resources to the host swap hypervisor to match the primary hypervisor, and re-establishing all the virtual machines that were connected to the primary hypervisor.

10. The article of manufacture of claim 9 further comprising a plurality of failure indicators that are monitored by the monitor of the host swap hypervisor to determine whether the host swap hypervisor will take over management of the virtual machines from the primary hypervisor.

11. The article of manufacture of claim 10 wherein each failure indicator has a severity score and the monitor adds the severity score for each observed failure indicator to find a total severity score, and the total severity score is compared to a threshold to determine whether the host swap hypervisor should take over management of the primary hypervisor.

12. The article of manufacture of claim 9 further comprising:
   virtual machine mappings stored by the primary hypervisor that contain processor, storage and memory information for the virtual machines managed by the primary hypervisor; and
   mappings data stored by the host swap hypervisor that contains processor, storage and memory information for the virtual machines managed by the primary hypervisor.

13. The article of manufacture of claim 12 wherein the mappings data stored by the host swap hypervisor includes historical processor, historical storage and historical memory information for the virtual machines managed by the primary hypervisor.

14. The article of manufacture of claim 9 wherein the host swap hypervisor is a virtual machine operating on the physical host computer system.

15. The article of manufacture of claim 9 wherein the primary hypervisor is reconfigured to become a new host swap hypervisor after a failure of the primary hypervisor and after the host swap hypervisor takes over the management of the primary hypervisor.

16. The article of manufacture of claim 15 wherein the host swap hypervisor performs an integrity check as part of taking over management of the primary hypervisor.

17. A computer-implemented method executed by at least one processor for providing a high availability hypervisor, the method comprising:
   providing a primary hypervisor on a host computer system that manages virtual machines on the host computer system;
   providing a host swap hypervisor on the host computer system with a monitor that monitors failure indicators of the primary hypervisor and conditions of the host computer system, wherein the failure indicators are used by the hypervisor to determine whether the host swap hypervisor will take over management of the virtual machines from the primary hypervisor;
   the host swap hypervisor taking over management of the virtual machines when the failure indicators indicate a failure of the primary hypervisor; and
   wherein the step of taking over management of the virtual machines further comprises the steps of;
   redefining the host swap hypervisor with definitions, settings and attributes of the primary hypervisor;
   allocating necessary resources to the host swap hypervisor to match the primary hypervisor;
   re-establishing all the virtual machines that were connected to the primary hypervisor.

18. The method of claim 17 further comprising the steps of:
   providing a severity score for each failure indicator,
   adding severity scores for each observed failure indicator to find a total severity score, and
   comparing the total severity score to a threshold to determine whether the host swap hypervisor should take over management of the primary hypervisor.

19. The method of claim 17 further comprising:
   virtual machine mappings stored by the primary hypervisor that contain processor, storage and memory information for the virtual machines managed by the primary hypervisor; and
   mappings data stored by the host swap hypervisor that contains processor, storage and memory information for the virtual machines managed by the primary hypervisor.

20. The method of claim 17 wherein the step of taking over management of the virtual machines further comprises:
   performing an integrity check.

* * * * *